Dec. 11, 1951  J. MILLS  2,578,573
GLASS SPIKE DETECTOR
Filed Aug. 15, 1946  6 Sheets-Sheet 1

Fig.1.

INVENTOR.
JOHN MILLS
BY
James D. Bock
ATTORNEY

Dec. 11, 1951         J. MILLS         2,578,573
GLASS SPIKE DETECTOR Filed Aug. 15, 1946         6 Sheets-Sheet 2

Fig.2.

INVENTOR.
JOHN MILLS
BY
James D. Bock
ATTORNEY

Dec. 11, 1951 J. MILLS 2,578,573
GLASS SPIKE DETECTOR
Filed Aug. 15, 1946 6 Sheets-Sheet 5

INVENTOR.
JOHN MILLS
BY
James D. Bock
ATTORNEY

Dec. 11, 1951  J. MILLS  2,578,573
GLASS SPIKE DETECTOR
Filed Aug. 15, 1946  6 Sheets-Sheet 6

INVENTOR.
JOHN MILLS
BY
James D. Bock.
ATTORNEY

Patented Dec. 11, 1951

2,578,573

UNITED STATES PATENT OFFICE 2,578,573

GLASS SPIKE DETECTOR

John Mills, Drexel Hill, Pa., assignor to Hires, Castner & Harris, Inc., Philadelphia, Pa., a corporation of Delaware Application August 15, 1946, Serial No. 690,784

3 Claims. (Cl. 209—88)

The present invention relates to a sorting device and more particularly to an automatically operating device for sorting unfilled open-mouth containers made of glass and the like on the basis of whether or not said containers have imperfections of a particular type in or attached to the bottom walls thereof.

In the manufacture of many types of glass containers, for example the relatively small open-mouth containers used for packaging baby food, it is the practice to insert a charge of glass into a mold by means of a plunger. The plunger is projected into the mold for such a distance as to define the bottom wall of the container. The relative temperatures of the plunger, mold and charge of glass must be very carefully controlled in order that the plunger may be withdrawn without pulling some or all of the glass away from the bottom of the mold. The surfaces of the plunger and particularly the bottom surface thereof must be kept in smooth and highly polished condition inasmuch as any defects or roughness will result in a tendency toward sticking of the molten glass to the plunger. One of the most frequent defects in glass containers results from sticking of the glass in the bottom wall to the lower surface of the plunger and such defects occur in spite of the most exacting efforts to avoid it. Inasmuch as the molten glass tends to stick to the plunger only at isolated points, the resulting defects in the containers usually take the form of long, thin "spikes" which extend upwardly from the bottom. In many instances such spikes will be relatively thick at the base thereof and will taper to very sharp points. Rigid inspection is maintained in glass factories to detect these and other defects and it has been noted that once a particular plunger starts to leave spikes in the containers, it is most likely to continue to do so and usually with exaggerated effect. When such a condition is observed, it is necessary to clean the plunger to remove from it any residue of glass and to make the necessary adjustments in temperature and the like to avoid recurrence. In spite of such careful inspection, a number of defective containers having spikes in the bottoms are likely to be produced in any manufacturing operation. While most of these defective containers will be caught by inspectors and removed from the line, experience has shown that a certain number of defective containers will escape detection and proceed through the line and find their way into a customer's plant. In spite of rigid inspection which may be maintained by the customer, the defective containers occasionally are filled and sold. In some instances the spikes will break off either in process of handling or filling or in removal of the contacts by the ultimate consumer and it is obvious that the presence of broken pieces of glass in the food product is objectionable.

It is an object of the present invention, therefore, to provide a sorting device which is specifically designed to detect the presence of spikes in the bottoms of molded glass containers and to reject from the line any container having a spike of such size as to be likely to cause difficulty.

The present invention offers not only a structure fulfilling this specific object, but also provides a novel mechanical arrangement which is capable of use in other related fields. Other and further objects of the invention will become more apparent from a consideration of the following detailed description of a preferred but not necessarily the only form of the invention taken in connection with the drawings accompanying and forming a part of this specification.

Figure 1:
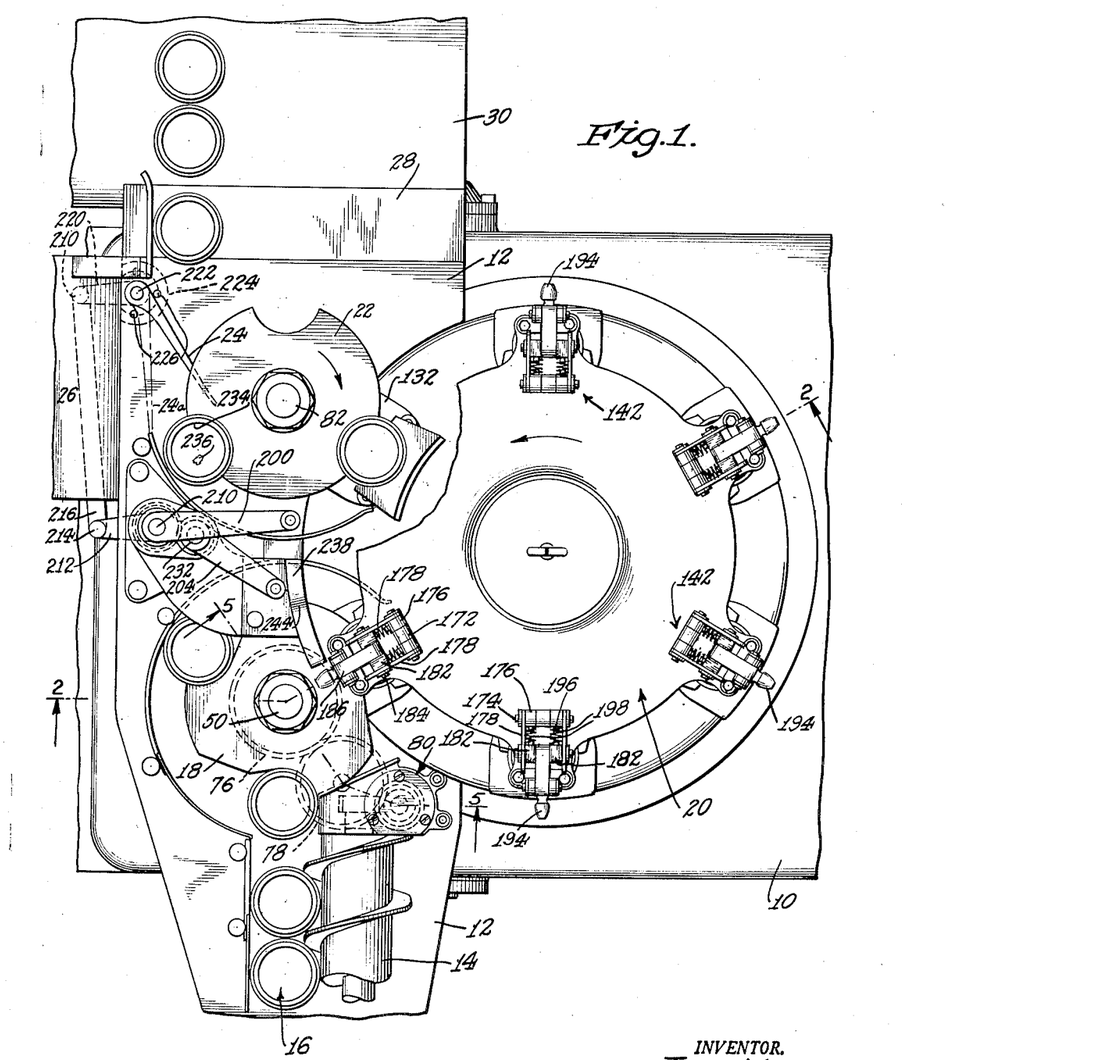
Fig. 1 is a plan view with certain parts broken away of a machine embodying the present invention.

Referring now to the drawings, in Fig. 1 there is shown a machine comprising a base 10 having a plate 12 extending thereacross and having a helical conveyor 14 associated therewith to carry a series of containers generally indicated at 16 into the machine. The containers are brought into engagement with an intake star wheel 18 which rotates in a clockwise direction to place individual containers in properly spaced relation upon a turret 20 which carries the detecting mechanism to be described in detail hereinbelow. The turret 20 rotates in a counterclockwise direction and delivers the containers individually to a discharge star wheel 22 which rotates in a clockwise direction. A gate 24 is provided adjacent the star wheel 22 and is adapted to be moved into one of two positions. In the position shown in full lines in Fig. 1, the gate 24 is projected into the path of a container about to be released from the star wheel whereby to guide the container to a reject chute 26. In the other position of the gate 24 diagrammatically shown in broken lines at 24a in Fig. 1, the gate will serve to guide containers discharged from the star wheel 22 across the plate 12 and chute 28 to a conveyor 30 which serves to conduct accepted containers to a desired point. The gate 24 is controlled by the detecting mechanism carried by the turret 20 and it assumes one or the other of its positions at the proper time to accept or reject a container.

Figure 4:
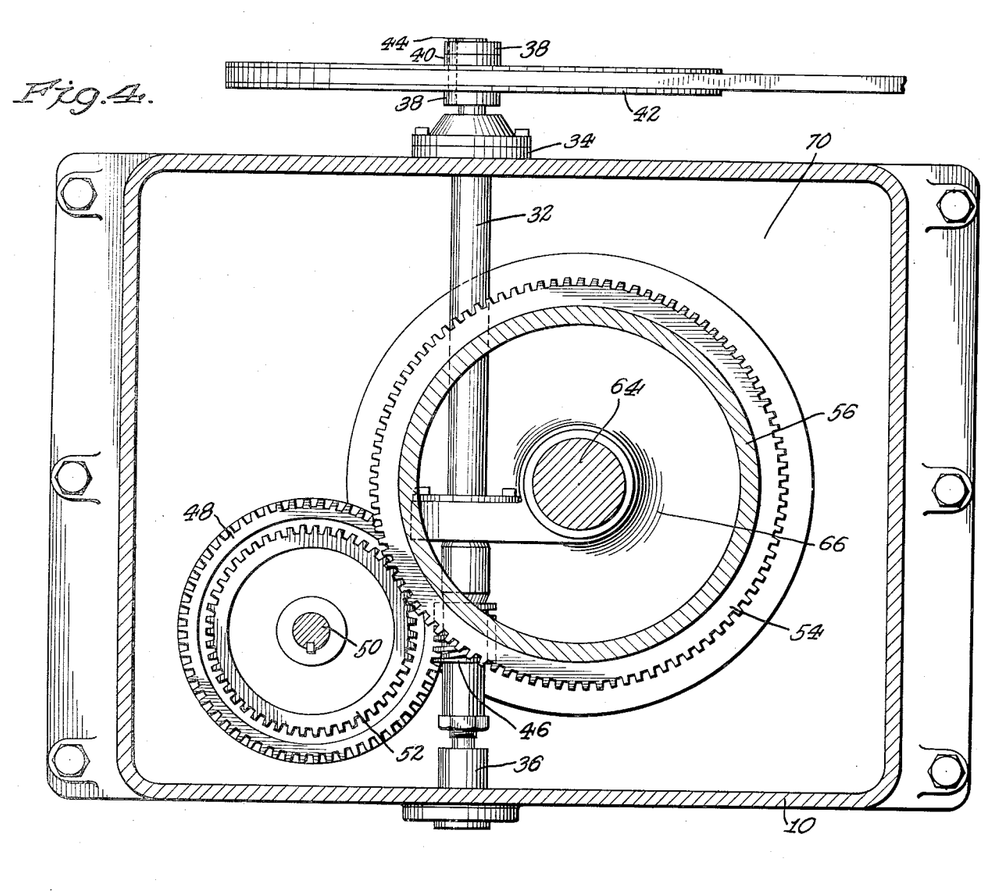
Fig. 4 is a horizontal section taken along the line 4—4 in Fig. 2.

Referring now to Fig. 4, there is shown a drive shaft 32 mounted in suitable bearings 34 and 36 in the base 10. One end of the shaft 32 projects outside the base 10 and has fixed thereto spaced collars 38 between which is mounted a hub 40 of a drive pulley 42. A shear pin 44 extends through the collars 38 and the hub 40 to establish driving relationship between the pulley 42 and the shaft 32. The shear pin 44 is so designed as to break in the event of a jam in the machine as will be described hereinbelow. The pulley 42 may be driven by any suitable source of power as, for example, a motor (not shown).

Within the base 10 the shaft 32 is provided with a worm 46 which engages with a worm wheel 48 fixed to a vertical shaft 50. The shaft 50 also has fixed thereto a gear 52 which meshes with gear teeth 54 formed on a ring 56.

Figure 2:
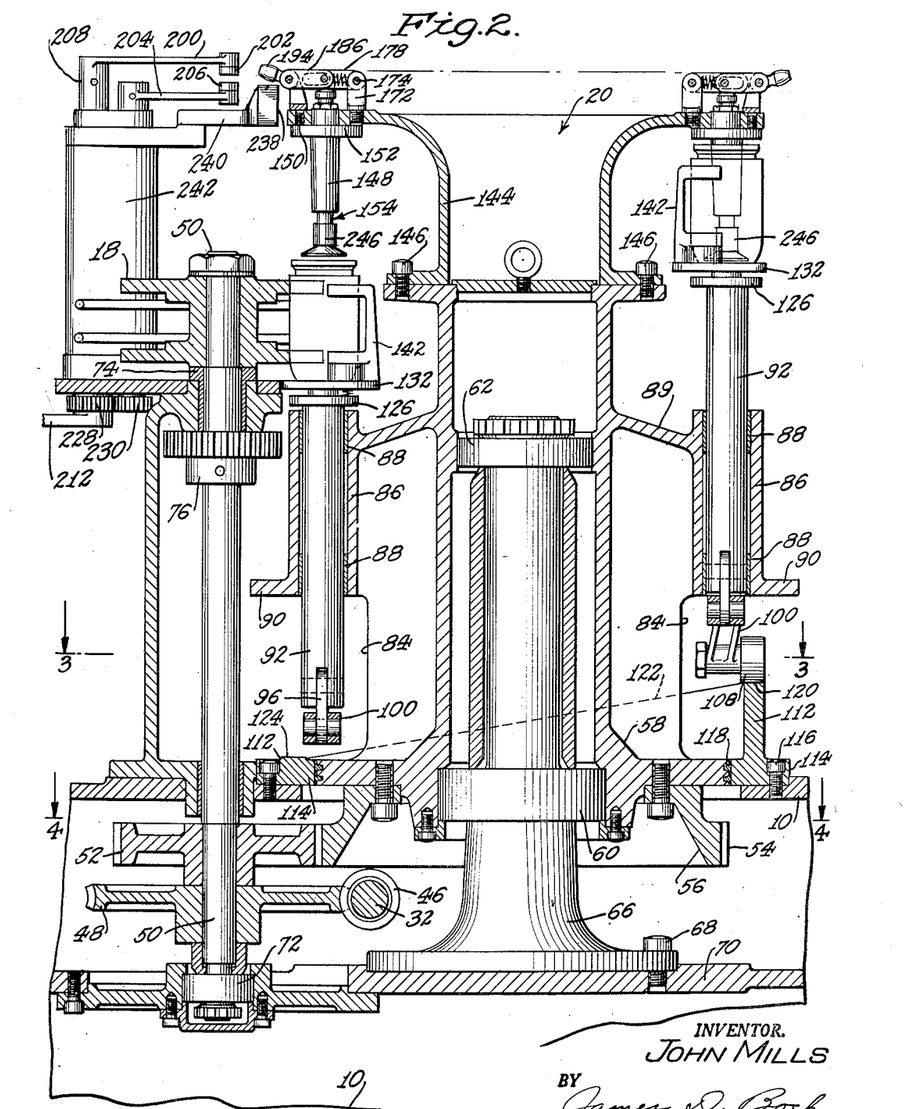
Fig. 2 is a section along the irregular line 2—2 in Fig. 1.

Referring now to Fig. 2, the ring 56 is secured to a hollow casting 58 as by screws 57. The casting 58 is supported for rotation upon bearings 60 and 62 carried by a post 64 flanged at its lower end 66 for attachment as by screws 68 to a horizontal portion 70 of the base 10. The hollow casting serves as the principal structural element of the rotary turret shown generally at 20 in Fig. 1.

Figure 5:
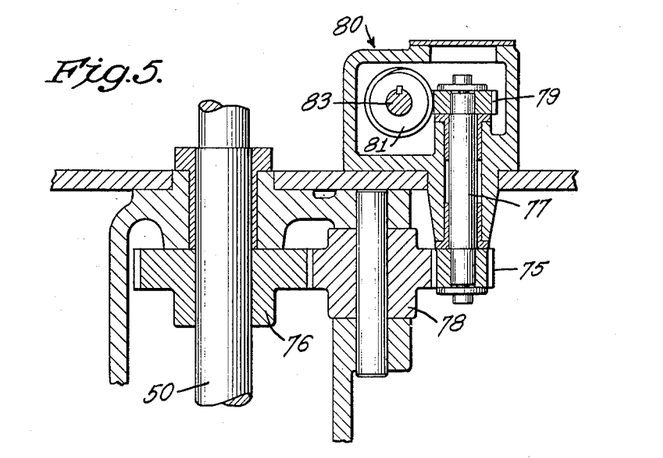
Fig. 5 is a vertical section taken along the irregular line 5—5 in Fig. 1.

Referring again to Fig. 2, the intake star wheel 18 is fixed to the vertical shaft 50 which is supported for rotation in a lower bearing 72 and an upper bearing 74. The shaft 50 also has fixed thereto a gear 76 which meshes with a gear 78 (see Figs. 1 and 5) to drive a suitable mechanism 80 for rotating the helical conveyor 14. The mechanism 80 is shown in detail in Fig. 5 wherein the gear 78 meshes with a gear 75 fixed to a shaft 77 having a helical gear 79 at its upper end. A helical gear 81 meshes with the gear 79 and is fixed to a horizontal reduced portion 83 of the helical conveyor shaft.

The discharge star wheel 22 is fixed to a vertical shaft 82 (Fig. 1) which carries at its lower end a gear (not shown) similar to the gear 52 (Fig. 2) and which meshes with the teeth 54. The discharge star wheel 22 is thus driven for clockwise rotation.

Figure 3:
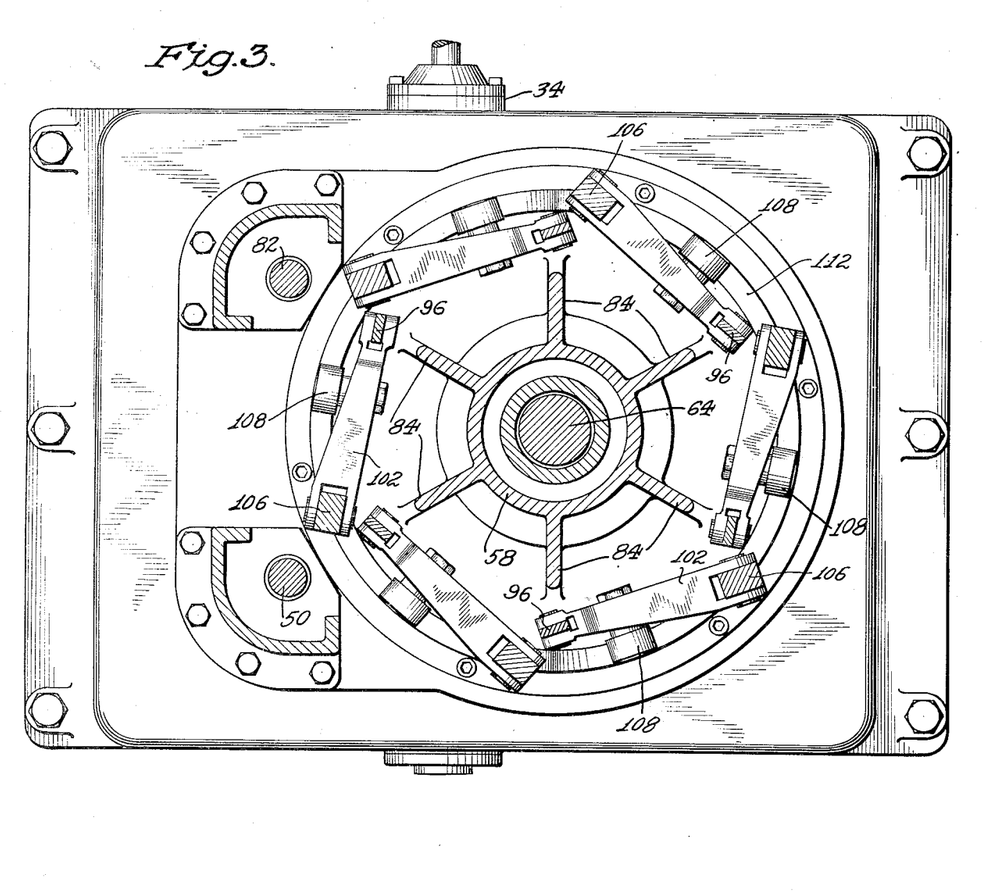
Fig. 3 is a horizontal section taken along the line 3—3 in Fig. 2.

As shown in Figs. 2 and 3, the casting 58 of the turret 20 has a plurality of radially extending fins 84 formed thereon. In the embodiment chosen for illustration there are six fins 84 each of which extends to a vertically disposed guide sleeve 86 having bearing inserts 88 therein. The guide sleeves 86 may be formed in a generally bell-shaped casting 89 integral with the casting 58 and fins 84 and having a flange 90 extending therearound.

Figure 6:
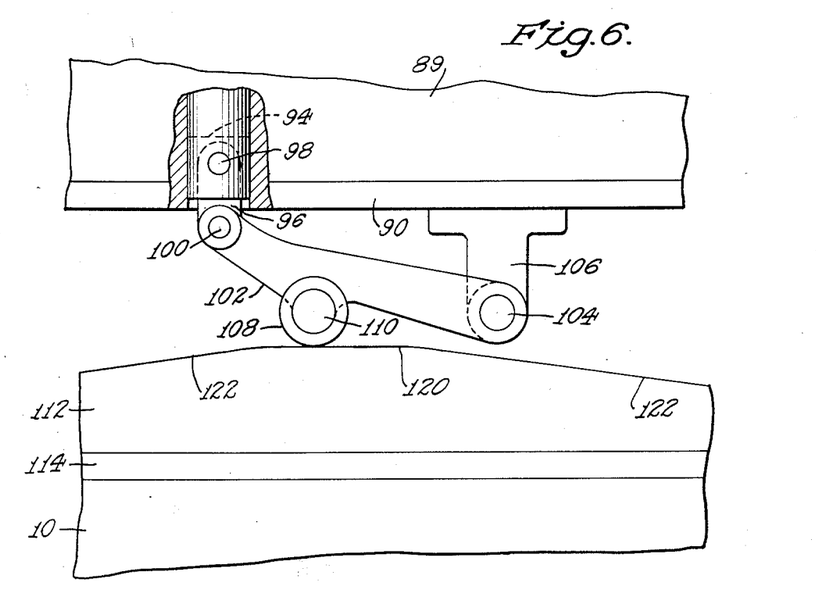
Fig. 6 is a detailed view partially in section of a cam and follower mechanism.

In each of the sleeves 86 there is mounted for vertical reciprocation a rod 92. At the lower end of each rod 92 there is formed a diametral recess 94 (see Fig. 6) which receives a short link 96 freely pivoted on a pin 98 extending through the rod 92. Each of the links 96 is pivoted at 100 to the free end of an arm 102 pivoted at 104 to a bracket 106 secured to the casting 89. Each arm 102 carries intermediate its length a roller 108 mounted for free rotation on a suitable bearing 110.

The rollers 108 are arranged to follow a fixed cam 112 formed on a ring 114 secured as by screws 116 to the base 10. As shown in Fig. 2, the cam ring 114 surrounds a flange on the rotatable casting 58 and a suitable packing 118 may be positioned between these parts, if so desired. The cam 112 is provided with a high portion 120 (see Fig. 6) and inclined portions 122 leading to a low portion 124 as seen in the left-hand portion of Fig. 2.

The mechanism just described will raise and lower the rods 92 as the turret 20 is rotated. The extent of vertical movement of the rods 92 must be somewhat greater than the depth of the deepest container to be sorted by the device of the present invention.

At their upper ends each of the rods 92 is provided with a flange 126 and a recess 128 (see Figs. 7 and 8) to receive a base 130 of a container-supporting table 132. The table 132 and base 130 are centrally bored to receive a screw 134 having a smooth shank 136 and a reduced threaded portion 138 entering the rod 92. The smooth shank 136 is sufficiently long to permit limited vertical movement between the table 132 and rod 92 and expansive springs 140 are arranged between the flange 126 and table 132 to yieldably hold the table 132 in its upper position as shown in both of Figs. 7 and 8. The table 132 is provided with a suitably shaped retainer 142 which, as shown in the drawings, may comprise spaced upper and lower plates having semi-circular recesses therein to receive and retain a generally cylindrical container.

As shown in Fig. 2, the upper surfaces of the tables 132 are flush with the surface of the plate 12 when they are positioned adjacent the intake star wheel 18. This arrangement permits the containers to be smoothly transferred by the star wheel 18 from the plate 12 to the tables 132. Similarly, the tables 132 are flush with the plate 12 when they are adjacent the discharge star wheel 22. To this end the low portion 124 of the cam 112 is at such a level as to bring the surfaces of the tables 132 flush with the plate 12 when they approach the discharge star wheel 22. Preferably the low portion of the cam is provided with a dwell so that the tables 132 will remain flush with plate 12 until they have passed the intake star wheel 18. Thereafter the tables 132 are gradually elevated and then lowered by the inclined portions 122 of the cam 112.

The detecting devices are carried by the turret 20, there being a detecting device for each of the container elevating tables 132. In the embodiment shown in the drawings there are therefore six detecting units indicated generally at 142 in Fig. 1. In general the detecting units include a plunger so positioned above each of the tables 132 that as a container carried by a table 132 is elevated, the plunger will enter the open mouth of the container and be projected to the bottom thereof. If the container has a bottom wall of normal thickness and is free of spikes or other imperfections extending above the bottom, the plunger of the detecting mechanism will not be raised. If the container has a spike or other similar imperfection, the plunger will be raised and such action will position other parts of the detecting means in such manner as to move the gate 24 into the position shown in full lines in Fig. 1.

As shown in Fig. 2, the detecting devices are carried adjacent the rim of an inverted bell-shaped casting 144 secured to the casting 58 as by screws 146. Each of the detecting units includes a vertically disposed sleeve 148 secured to the flange of the casting 144 as by screws 150 passing through a flange 152 formed on each of the sleeves 148. The central bore of each of the sleeves 148 receives a plunger 154.

Figures 7, 8:
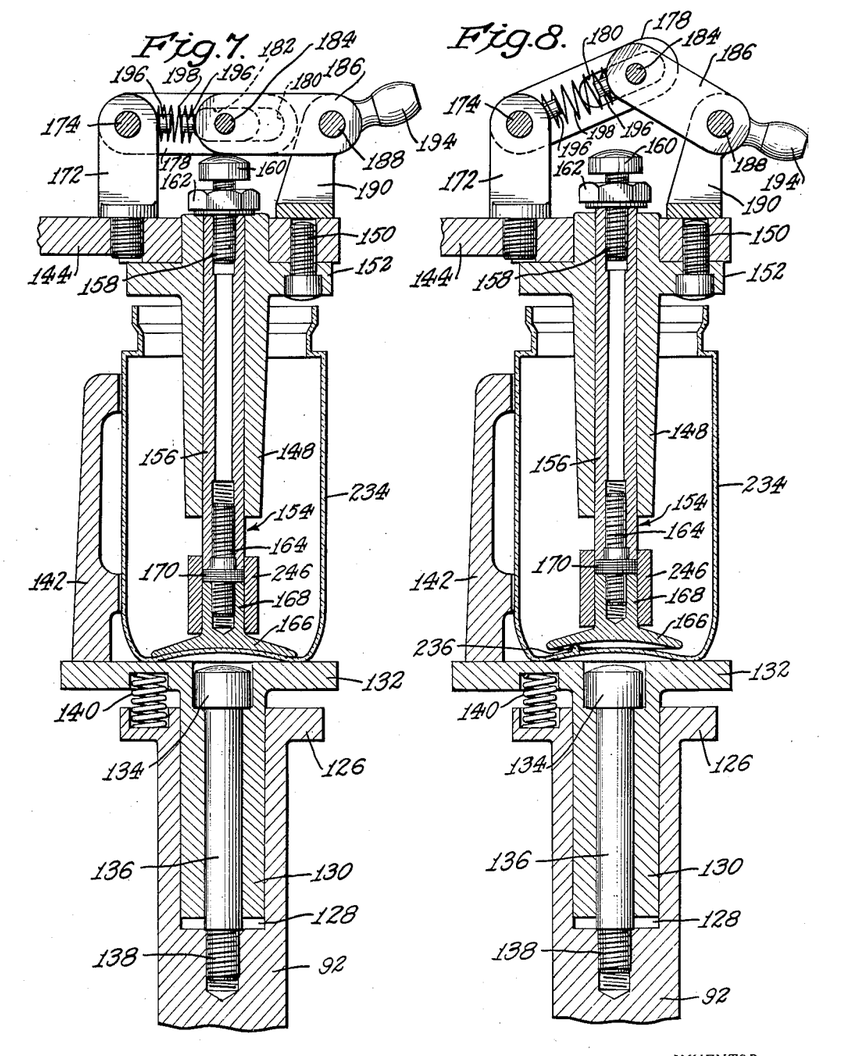
Figs. 7 and 8 are sectional views illustrating the position of the detecting mechanism in a perfect and in a defective container, respectively.

Referring now to Figs. 7 and 8, it will be observed that the plungers 154 comprise a tube 156 internally threaded at the upper end to receive a screw 158 having a smoothly-rounded head 160 formed thereon and having a stop nut 162 threaded thereon. The stop nut 162 may be adjusted along the screw 158 in order to determine the height of the head 160 above the level of the upper surface of the casting 144.

At its lower end the tube 156 is threaded to receive a stud 164 one threaded end of which projects below the end of the tube 156. The head of the plunger 154 comprises a body 166 internally threaded to receive the stud 164. The shank portion 168 of the body 166 is preferably of substantially the same diameter as the tube 156. Any desired number of shims 170 may be positioned between the lower end of the tube 156 and the upper end of the shank 168. The number of shims 170 will determine the overall length of the plunger 154.

Preferably the lower surfaces of the bodies 166 are so contoured as substantially to match the contour of the bottoms of the containers for which the machine is designed. Thus, as shown in Figs. 7 and 8, the bottoms of the containers are slightly convex in which event the lower surfaces of the heads 154 are preferably made concave. In this manner the detecting mechanism will be most certain to detect spikes or to detect other abnormalities in the contour of the bottoms of the particular containers being tested.

As shown particularly in Figs. 1, 7 and 8, a toggle mechanism is arranged above each of the plungers 154 and is so disposed that a predetermined amount of vertical movement of the plunger 154 will trip the toggle and move a nose into such position as to control the gate 24 to reject the container which caused vertical movement of the plunger 154. The toggle mechanism includes a lug 172 perforated to receive a freely rotatable pin 174. On either side of the lug 172 the pin 174 has fixed thereto collars or hubs 176 to which are fixed parallel links 178. The links 178, collars 176 and the pin 174 are thus capable of rotation as a unit about the center of the pin 174. The free end of each of the links 178 has formed therein a slot 180 (see Fig. 7) which extends longitudinally of the link 178. A block 182 is arranged to slide within the slots 180 of each of the links 178. The blocks 182 are centrally bored to receive a pin 184 which extends through the blocks and serves in its central portion as a bearing for a link 186 pivoted at 188 in a bracket 190 secured to the top of the casting 144 as by cap screws 192 (see Fig. 1). The link 186 has formed thereon a nose 194 which, as shown in the drawings, may be arranged to project upwardly at an angle to a line passing through the pins 174 and 188.

Each of the hubs 176 and the blocks 182 is provided with a projection 196 (see Fig. 1). These projections are arranged in opposed pairs and serve as seats for expansive springs 198 which tend to push the blocks 182 forward within the slots 180.

The links 178 and 186 thus form a spring-loaded toggle. The screw 160 on the upper end of the plunger 154 is so adjusted that when the toggle is in the position illustrated in Fig. 7, the pin 184 will lie at or slightly below dead center in order that the springs 198 may hold the toggle in the straightened position illustrated in said Fig. 7. When the screw 160 is moved vertically through a distance sufficient to carry the pin 184 above dead center, the force of the springs 198 will be exerted to snap the toggle into the broken position illustrated in Fig. 8.

The noses 194 will therefore occupy either one of two definite positions. One of these positions is illustrated in Fig. 7 wherein the toggle is straightened and the other is illustrated in Fig. 8 wherein the toggle is broken. During rotation of the turret 20 the noses 194 of the several detecting mechanisms will therefore rotate within one or the other of two vertically spaced horizontal planes.

The control mechanism for the gate 24 is positioned within the path of the noses 194 and includes means alternately presented in the planes in which the noses 194 rotate. The gate-controlling mechanism is shown most clearly in Figs. 1 and 2. Referring first to Fig. 2, this mechanism includes a lever 200 having a roller 202 on the free end thereof disposed in the plane of rotation and in the path of rotation of the noses 194 when they are in their upper position as illustrated in Fig. 7. The mechanism also includes a lever 204 having a roller 206 on the free end thereof disposed in the plane and path of rotation of the noses 194 when they are in the position illustrated in Fig. 8. The lever 200 is provided with a hub 208 which is pinned to a vertical shaft 210 (see Fig. 1) the lower end of which has secured thereto an arm 212. The arm 212 is pivotally connected at 214 to a link 216 which is connected at its other end at 218 to an arm 220. The arm 220 lies beneath the plate 12. A vertical shaft 222 is carried in suitable bearings 224 mounted on the plate 12 and extends thereabove to have secured to it the gate 24. The swinging movement of the gate 24 is limited by two angularly-spaced stop pins 226.

Referring again to Fig. 2, the vertical shaft 210 on which the arm 212 is secured also has fixed thereon a gear 228 which meshes with a gear 230 secured on the lower end of a vertical shaft 232 (see Fig. 1). The vertical shaft 232 has secured to its upper end the lever 204 discussed above. The levers 200 and 204 are thus connected through the gears 228 and 230 for joint motion in opposite angular directions whereby upon impact of a nose 194 with the roller carried by one of these levers, this particular lever will be rotated in clockwise direction as viewed in Fig. 1, and the other lever will be rotated in a counterclockwise direction.

The levers are so disposed that when either of them is moved by a nose 194 in the manner discussed above, it will be moved out of the path of any successive noses 194 lying in the same plane as the nose which effected such movement. The opposite lever 200, or 204 as the case may be, is moved in a counterclockwise direction and thus brought into the path of any nose 194 lying in the other plane. Thus, if a series of perfect containers is passing through the machine, all of the noses 194 will remain in the position shown in Fig. 7. The first nose in such a series may move the lever 200 in a clockwise direction to swing the gate 24 to the position shown in broken lines at 24a (Fig. 1). The containers leaving the turret 20 and passing around the star wheel 22 will be guided by the gate 24 (in position 24a) across the plate 12 and chute 28 on to the conveyor 30. When a defective container such, for example, as the container shown at 234 in Fig. 8 which has a spike 236 in the bottom thereof, is brought into the machine, the associated plunger 154 will be elevated by the spike 236 to break the toggle mechanism and lower the nose 194. When this particular nose 194 reaches the position of the lever 204, it will strike said lever and swing it in a clockwise direction to bring it back to the position shown in Fig. 1. This operation will result in swinging of the gate 24 to the full line position in Fig. 1 and the movement of lever 200 back into such position as to be engaged by the next nose 194 which is in the position indicating an acceptable container. As shown in Fig. 1, the location of the levers 200 and 204 relative to the star wheel 22 is such that motion of the gate 24 occurs in proper timed relation to the movement of the containers. Thus, as shown in Fig. 1, the container 234 having the spike 236 therein is just about to strike the gate 24 and be deflected thereby to the reject chute 28. If the next container is free of such defects the nose 194 of the associated detecting mechanism will be in position to move lever 200 and thus to swing the gate 24 to the position 24a in time to guide such container to the conveyor 30.

Means is provided for returning all of the toggle mechanisms which may have been moved to broken position to the straightened position as shown in Fig. 7. To this end a cam 238 may be secured by means of suitable brackets 240 to a casing 242 within which the vertical shafts 210 and 232 are carried. The cam 238 is provided with an incline 244 which is so disposed as to engage any nose 194 which happens to be in the lowered position and to elevate the nose to its upper position as illustrated in Fig. 2, for example.

It is preferred to provide certain safety devices to avoid damage to the toggle mechanism such as might occur in the event a container were to be fed through the machine in inverted position or in the event the bottom of the container might be unduly thick. It is apparent that in either of these situations the tendency would be for the associated plunger 154 to be elevated to such an extent as to cause damage to the toggle mechanism. While this may be prevented in various ways, it has been observed that such occurrences are so infrequent as not to warrant the provision of elaborate give-way mechanisms. The springs 140 provided between the rods 92 and tables 132 will take care of all normally encountered defective containers such, for example, as those which have stout spikes of more than ordinary height and it is of course possible to increase the amount of give-way space provided at this point. However, to take care of inverted containers and the like, it is preferred to provide safety collars 246 as shown in Figs. 7 and 8. The collars 246 may be positioned upon the portion of the plungers 154 which extends below the sleeves 148. The space between the upper edges of the collars 246 and the lower edges of the sleeves 148 should be such as to permit the plungers to rise only such distance as will not cause damage to the toggle mechanism. Thus, if an inverted container or the like is encountered, it will raise the plunger 154 to the extent permitted by the collar 246 and the machine will jam. The sensitive shear pin 44 in the main drive pulley (see Fig. 4) will break upon the occurrence of any such jam. The machine will come to a stop and must be cleared and the shear pin replaced before operation may be resumed.

It is preferred to make use of the safety collars 246 rather than to extend the sleeves 148 in such proximity to the heads 166 of the plungers 154 as to accomplish generally the same result. This preference lies in the fact that the collars 246 may be secured in various adjusted positions or collars of different height may be used to accommodate adjustments in length of the plungers 154 or adjustments of the screws 160.

The toggle mechanism provided herein is particularly suitable for detecting spikes in the bottoms of glass containers because it may be adjusted to operate upon very light pressure. The spikes may be very slender and fragile and thus likely to be crushed even by the detecting mechanism herein provided. However, even the most fragile spike will exert sufficient pressure to trip the toggle mechanism and it is immaterial whether or not the spike is thereafter crushed.

From the above detailed description it will be apparent that a sorting device has been provided which is not only peculiarly adapted to the particular purpose herein described, but which may be generally adapted to the sorting of articles on various bases. The terms used in the present description are intended to be descriptive rather than limiting in sense and it is to be understood that variations and modifications may be resorted to by those skilled in the art without departing from the scope of the appended claims.

I claim:

1. In a device for detecting "spikes" in the bottoms of open-mouth glass containers, the combination of means for moving a succession of unsorted containers through a predetermined path; a plunger insertible into the mouth of a container traveling through said predetermined path; a support for said plunger, said plunger being mounted for limited lengthwise movement relative to said support upon encountering even momentary resistance from an obstruction in the container; means for causing relative movement between said container and said support to bring one end of said plunger into the mouth of said container, the maximum extent of said movement being sufficient to bring said end of said plunger substantially into abutment with the bottom of a container having a bottom wall of normal thickness and free from "spikes" without causing relative movement between said plunger and said support; a mechanism carried by said support comprising a toggle having a central pivot and an over-centering spring, said toggle when straightened being so positioned relative to the opposite end of said plunger that movement of said plunger relative to said support will so move the central pivot of said toggle as to cause said over-centering spring to break the toggle; and means controlled by said mechanism for guiding said container into one of two separate paths depending upon whether or not said toggle has been broken.

2. In a device for sorting open-mouth glass containers, the combination of means for moving a succession of containers through a predetermined path, detecting means including a plunger insertible into the mouth of a container, means for causing relative movement between said container and said plunger to insert said plunger into said container, the maximum extent of said insertion being sufficient to bring said plunger substantially into abutment with the bottom of any container having a bottom wall of normal thickness and free of "spikes," a support for said detecting means, said plunger being mounted in said support for movement relative thereto in the event said plunger encounters a container having a bottom wall of greater than normal thickness or having a "spike" therein, said detecting means including a device movable relative to said support from one predetermined position to a second predetermined position instantaneously upon movement of said plunger relative to said support incident to the engagement of said plunger in a container with a "spike" or a bottom wall of greater than normal thickness, and means responsive to the positioning of said device in said second predetermined position for diverting from said predetermined path the container causing such movement.

3. In a device for detecting "spikes" in the bottoms of open-mouth glass containers, the combination of means for moving a succession of containers through a predetermined path, a rotary turret including a plurality of vertically movable container-supporting tables and a support overhanging containers positioned upon said tables, a plurality of plungers depending from said overhanging support and mounted for vertical movement relative thereto, means for successively elevating said container-supporting tables whereby to telescope each of said containers with one of said plungers, the maximum extent of said vertical movement of said containers being such as to bring the bottom of a container having a bottom wall of normal thickness and free from "spikes" substantially into engagement with the associated plunger without causing vertical movement of said plunger relative to said overhanging support whereby any container having a bottom of greater than normal thickness or having a "spike" therein will cause vertical movement of the associated plunger, a device associated with each of said plungers and actuated directly by movement of the plunger relative to the support to change instantaneously from one predetermined position to a second predetermined position, and means responsive to the positioning of said device in said second predetermined position for diverting from said predetermined path the container causing such movement of the associated plunger.

JOHN MILLS.

REFERENCES CITED

The following references are of record in the file of this patent:

UNITED STATES PATENTS

| Number | Name | Date |
|---|---|---|
| 1,769,039 | Sague | July 1, 1930 |
| 1,905,099 | Jay | Apr. 25, 1933 |
| 2,383,297 | Dorothea | Aug. 21, 1945 |
| 2,385,882 | Rolker | Oct. 2, 1945 |
| 2,407,062 | Darrah | Sept. 5, 1946 |

FOREIGN PATENTS

| Number | Country | Date |
|---|---|---|
| 262,272 | Germany | July 9, 1913 |
| 304,652 | Germany | Mar. 25, 1918 |